Sept. 23, 1969  E. LUX  3,468,053
SOUND PRODUCING DEVICE FOR FISHING
Filed Sept. 21, 1966
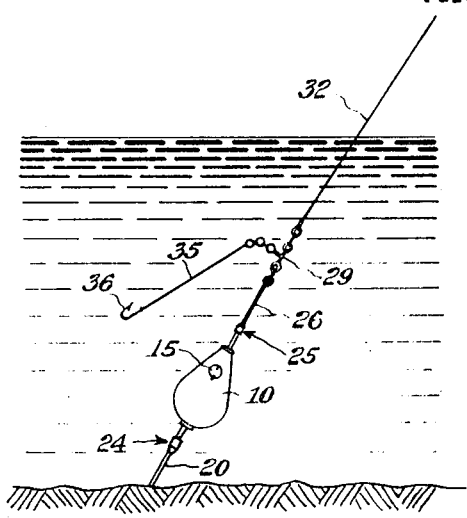
FIG. 1
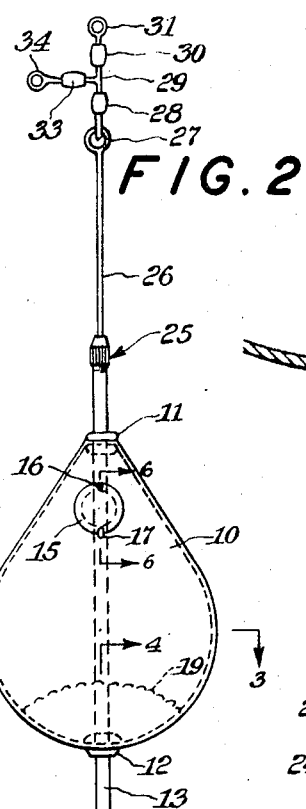
FIG. 2
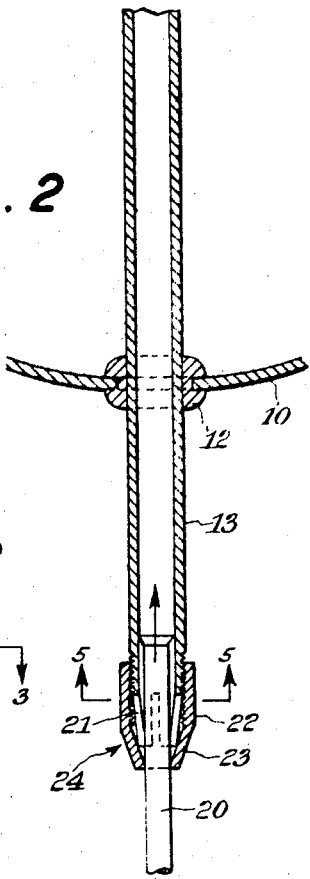
FIG. 4
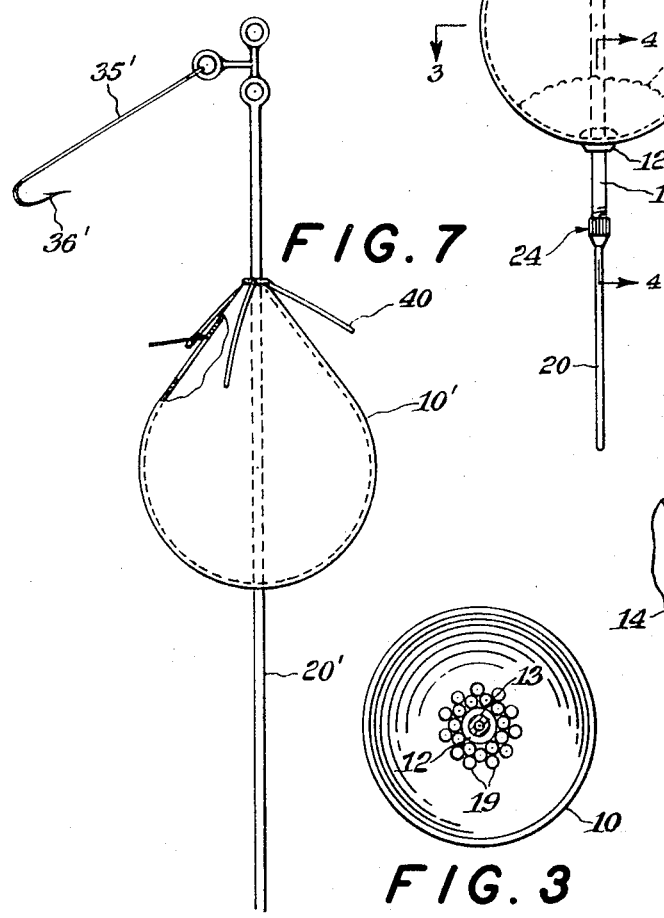
FIG. 7
FIG. 3
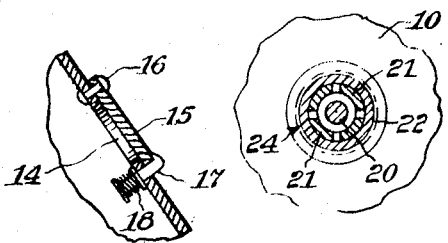
FIG. 5
FIG. 6
INVENTOR.
EDWARD LUX

# United States Patent Office 3,468,053
Patented Sept. 23, 1969

3,468,053
SOUND PRODUCING DEVICE FOR FISHING
Edward Lux, 74 Pearl St., Springville, N.Y. 14141
Filed Sept. 21, 1966, Ser. No. 581,423
Int. Cl. A01k 97/00
U.S. Cl. 43—42.31   1 Claim

ABSTRACT OF THE DISCLOSURE

A sound producing device for use during fishing, the device comprising a unit secured to the lower end of a fishing line and including a hollow receptacle disposed upon a shaft, the lower end of which rides upon the ocean floor. Pellets are placed within the receptacle which moves about to produce a rattling sound for attracting fish in deep water trolling.

---

This invention relates to improvements in fishing appliances and more particularly to a sound producing device, used in deep trolling for fish.

An important object of the invention is to provide such a device, which will not only provide the usual sound producing feature, but which can be readily adjusted to control the trolling position of the hook with respect to the bottom.

Another important object of the invention is to provide a simple and inexpensive sound producing device, which can be manufactured at a low cost and retailed at a correspondingly low monetary figure, yet affording numerous features not found in conventional chugging devices.

These and various other objects and advantages of the invention will become apparent to the reader of the following description.

In the drawing:

FIGURE 1 is a side elevational view showing the chugging device under water and engaging the bottom.

FIGURE 2 is a side elevational view (enlarged) of the device.

FIGURE 3 is a cross section taken on line 3—3 of FIGURE 2.

FIGURE 4 is an enlarged longitudinal sectional view taken on line 4—4 of FIGURE 2.

FIGURE 5 is a cross section taken on line 5—5 of FIGURE 4.

FIGURE 6 is a fragmentary enlarged sectional view taken on line 6—6 of FIGURE 2.

FIGURE 7 is a side elevational view (enlarged) of another embodiment of my invention.

Referring to the drawings wherein like numerals designate like parts, it can be seen that numeral 10 denotes a pear-shaped receptacle having openings at its upper and lower portions to receive bushings 11, 12, through which fit an elongated tube 13. The upper portion of the receptacle 10 has a small opening 14 in the side thereof, normally closed by plate 15, pivoted as at 16. A headed slide element 17, slidable through an opening adjacent the opening 14 has spring means 18 at the inner end thereof for pulling the same inwardly and engaging the head thereof against a portion of the swingable plate 15 to maintain the plate normally closing the opening 14.

The opening 14 is to permit placement of pellets or balls 19 within the receptacle 10 and of course these offer the usual rattling sound required in this type of fishing. Obviously, as the device moves over unlevel ground these elements 19 produce a rattling sound.

A bottom-engaging rod 20 has its upper end disposed into the lower portion of the tube 13 and through the slotted end of said tube 13. The tube 13 is slotted to provide fingers 21. The lower end of the tube 13 is threaded and over this is disposed the internally threaded portion of a sleeve 22 having an inwardly converging lower portion 23. The outside of the sleeve 22 is preferably knurled so that it can be readily fed onto the tube 13 so that the converged portion 23 thereof will ride against the tips of the fingers 21 and force the same inwardly to snug frictional engagement with the rod 20. Thus the rod 20 can be held in any adjustable position, extended or contracted, with respect to the receptacle 10.

The parts 21, 22 and 23 make up a detent structure which is generally referred to by numeral 24 and a similar detent structure generally referred to by numeral 25 is provided at the upper end of the tube 13 to accommodate a rod 26 which extends into the upper portion of the tube 13.

The upper end of the rod 26 preferably has an eye 27 connected to a swivel 28 on a T-connector 29. The T-connector 29 has a second swivel 30 equipped with an eye 31 to which the usual fishing line 32 is connected (see FIGURE 1) and this T-connector has a third swivel 33 having an eye 34 to which the leader 35 of a hook 36 is connected.

Obviously, through the opening 14 the pellets or balls 19 can be placed or removed as desired. The pear-shaped receptacle 10 is especially constructed and formed to produce the usual rattling sound as the elements 19 move about within the receptacle and of course the elevation of the hook 36 in the trolling operation can be selectively positioned by adjusting the rod 20.

Referring to the embodiment shown in FIGURE 7 there is shown a receptacle 10' which is identical to that disclosed in FIGURE 2. A rod 20' extends through the receptacle 10' and the rod 20' and receptacle 10' are fixed such that there is no relative movement between the rod 20' and the receptacle 10'.

Attached to the receptacle are a plurality of resilient depending fingers 40. The latter fingers preclude the hook 36' from becoming entangled in either rocks, weeds or other debris which may be on the bottom of the water bed. The fingers 40, since they are flexible, will not entangle the line if it becomes slack. Simply pulling on the line will release it from the fingers. While the fingers 40 are spaced from the hook 36', the fingers will sweep away weeds and other objects which are relatively close to the vicinicity of the hook.

Having thus described my invention, I claim as new and desire to secure by Letters Patent:

1. A sound producing device for use in water, comprising a receptacle, sound producing elements within said receptacle, a plurality of fingers being attached to said receptacle, said fingers being secured at their one ends above said receptacle and extending radially diagonally downward over the upper portion of said receptacle, a rod extending through said receptacle and being fixedly secured thereto, the lower end of said rod depending from said receptacle and being engageable with the sea floor, the upper end of said rod extending above the receptacle a distance approximately equal to the longitudinal dimension of the receptacle and having an eye connected to an eye on a swivel, a T-connector connected at one end of its cross-arm to said swivel and at the opposite end of its cross-arm to a second swivel carrying an eye for securement to a fishing line, the leg of said T-connector extending transversely to a third swivel carrying an eye to which the eye of a fishing hook is connected whereby said fishing hook is located above said radially extending fingers.

References Cited

UNITED STATES PATENTS

| | | | |
|---|---|---|---|
| 1,178,861 | 4/1916 | Kruschke | 43—42.4 |
| 1,768,033 | 6/1930 | Deatz | 43—42.4 |
| 2,659,176 | 11/1953 | Wenger | 43—42.31 |
| 2,741,864 | 4/1956 | Shotton | 43—42.31 X |
| 2,940,207 | 6/1960 | Scott | 43—44.96 X |

FOREIGN PATENTS 551,176  1/1958  Canada.

SAMUEL KOREN, Primary Examiner

D. J. LEACH, Assistant Examiner

U.S. Cl. X.R.

43—42.4, 43.1, 43.14, 44.96